United States Patent [19]

Nicolaides

[11] 3,918,032

[45] Nov. 4, 1975

[54] AMORPHOUS SEMICONDUCTOR SWITCH AND MEMORY WITH A CRYSTALLIZATION-ACCELERATING LAYER

[75] Inventor: Ruth Vogel Nicolaides, Andover, N.J.

[73] Assignee: The United States of America as represented by the Secretary of the Army, Washington, D.C.

[22] Filed: Dec. 5, 1974

[21] Appl. No.: 529,877

[52] U.S. Cl. .................... 340/173 R; 357/2; 357/71

[51] Int. Cl.[2] .................... G11C 11/34; H01L 45/00

[58] Field of Search ....... 340/173 R, 166 R; 338/20; 357/2, 71

[56] References Cited

UNITED STATES PATENTS 3,675,090 7/1972 Neale .................................... 357/2

OTHER PUBLICATIONS

O'Hanlon, Reducing the Forming Voltage in a $Nb_2O_5$ Switchable Resistor, IBM Technical Disclosure Bulletin, Vol. 14, No. 11, 4/72, p. 3365, 357/2.

*Primary Examiner*—Stuart N. Hecker
*Attorney, Agent, or Firm*—Nathan Edelberg; Robert P. Gibson; Max Yarmovsky

[57] ABSTRACT

A two terminal amorphous semiconductor device exhibits memory characteristics in one polarity and threshold switching in the opposite polarity when a pulsating AC half wave voltage signal is applied to its terminals. The device comprises an amorphous chalcogenide thin film sandwich positioned on an electrically insulating substrate of silicon oxide. The active film is asymmetrically disposed intermediate two layers of refractory electrode material. A crystallization-accelerating thin film material is interposed between the top refractory electrode material and the chalcogenide semiconductor film.

6 Claims, 4 Drawing Figures

AMORPHOUS SEMICONDUCTOR SWITCH AND MEMORY WITH A CRYSTALLIZATION-ACCELERATING LAYER

GOVERNMENTAL INTEREST

The invention described herein may be manufactured, used and licensed by or for the Government for governmental purposes without the payment to me of any royalty thereon.

BACKGROUND OF THE INVENTION

Various means have been used in the prior art to obtain threshold switching and memory semiconductor devices. Prior art devices have used amorphous semiconductor chalcogenide thin films in separate configurations using materials of different composition to obtain separate devices to perform each of these functions. It has been established that memory compounds generally lie close to the crystalline border while threshold switching compounds lie well inside the amorphous region of the glass composition diagram. One of the problems with prior art threshold switching devices has been that when the device was subjected to an overvoltage or to long usage, the switching mode of operation changed to the memory mode. This effect is normally not desirable in an electrical circuit because the operation mode of the device changes erratically and in some instances may finally go to complete failure by permanently setting into the memory mode on-state condition. Because of the problem of lack of stability, prior art devices requiring threshold switching and memory characteristics were separately constructed to perform each of these functions independent of each other. Another problem with prior art threshold devices, which were used as memory devices, and the normal memory devices as well, was that they generally required a relatively long pulse of approximately 100–200 milliseconds length with a trailing edge of approximately 15 milliseconds to "set" them into a memory on-state. In contrast to this, the present invention, which uses an asymmetrical constructed semiconductor film sandwich having an aluminum interlayer between the active film and one of its two electrodes, can be set "on," when it is in its memory mode, with a relatively short pulse of 20–70 microseconds without a trailing edge. In addition the memory on-state internal resistance of the prior art devices and the present invention differ to a substantial degree. Prior art devices, without the aluminum interlayer construction, show a memory on-state internal resistance which ranges between 500 and 1000 ohms, whereas, the present invention has a lower internal resistance which varies between 40–80 ohms.

SUMMARY OF THE INVENTION

The present invention relates to a two terminal amorphous chalcogenide thin film semiconductor device supported on an electrical insulator having good thermal conductor properties. The present device incorporates a crystallization-accelerating material, such as aluminum, in an asymmetrical construction which provides a single device which can reliably combine both threshold switching and memory functions. When the aluminum interlayer electrode side of the present device is made positive with respect to the other device terminal or electrode, the device exhibits fast memory setting. The difference in the present invention's behavior from prior art devices can be partially explained by the fact that the crystallization process is enhanced by the aluminum interlayer. Crystallization in a filament of a memory device has been recognized to start from the anode. This phenomenon was observed and reported by Messrs. Fritsche and Ovshinsky in The Journal of Non-Crystalline Solids, 4 (1970), p. 469–479.

An object of the present invention is to provide a two terminal amorphous semiconductor device which exhibits memory characteristics in one polarity and threshold switching when an opposite polarity is applied to its terminals.

Another object of the present invention is to provide an amorphous chalcogenide semiconductor switching device having a memory mode pulse setting time that does not exceed 20–70 microseconds.

Another object of the present invention is to provide an amorphous chalcogenide semiconductor threshold switching and memory device which utilizes a crystallization-acceleration material to promote memory setting times that do not exceed 20–70 microseconds.

Another object of the present invention is to provide an amorphous chalcogenide thin film semiconductor threshold switching and memory device which utilizes an aluminum interlayer as a crystallization-acceleration material intermediate an active chalcogenide layer and a top electrode made of a refractory type material such as molybdenum.

Another object of the present invention is to provide an amorphous thin film semiconductor threshold switching and memory device supported by an electrical insulator having good thermal conduction properties.

Another object of the present invention is to provide an amorphous semiconductor threshold switching and memory device which is reliable and has long life.

Another object of the present invention is to provide an amorphous semiconductor threshold switching and memory device which is small in size.

A further object of the present invention is to provide an amorphous semiconductor threshold switching and memory device which exhibits between the ranges of −40°C. to +125°C. identical threshold voltages in the threshold and memory modes which are independent of temperature.

A further object of the present invention is to provide an amorphous thin film semiconductor threshold switch and memory device whose internal resistance when in the memory on-state condition lies between 40–80 ohms.

For a better understanding of the present invention, together with other and further objects thereof, reference is made to the following descriptions taken in connection with the accompanying drawings.

BRIEF DESCRIPTION OF THE DRAWINGS

Throughout the following description like reference numerals are used to denote like parts of the drawings.

DESCRIPTION OF THE PREFERRED EMBODIMENTS

Figures 1, 2:
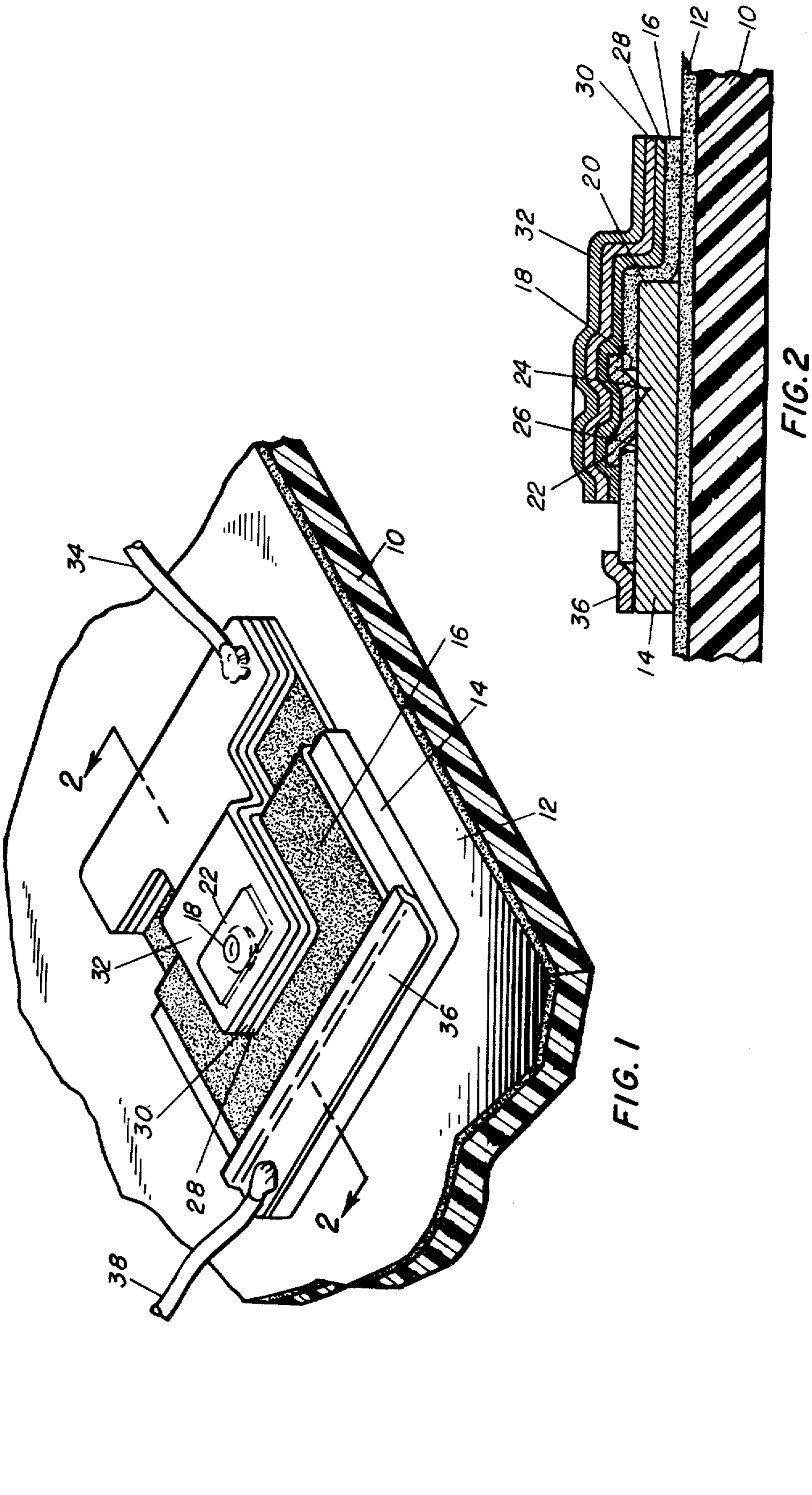
FIG. 1 is an isometric partial cutaway view of the amorphous semiconductor switching and memory device.
FIG. 2 is a cross-sectional view taken along line 2-2 of FIG. 1.

Referring now to FIGS. 1 and 2, a silicon substrate 10 has a silicon oxide layer 12 thereon, upon which a rectangular shaped, thin film, bottom electrode member 14 is deposited. Electrode member 14 is made of a refractory type material, such as molybdenum. A second silicon oxide thin film layer 16, having an orifice 18 etched therein, of approximately 50 microns in diameter, covers a portion of the bottom electrode member 14 and extends over one edge 20 of the bottom electrode member 14. A small rectangularly shaped amorphous chalcogenide thin film 22, approximately 1 micron thick, is vacuum deposited on the second silicon oxide 16 layer so that it covers and extends into orifice 18. Bottom side 24 of active chalcogenide film 22 is in contact with the top side 26 of bottom electrode 14. A first T shaped aluminum thin film interlayer member 28, approximately 0.7 microns thick, is then vacuum deposited over the chalcogenide film 22 and on a portion of the second silicon oxide layer 16. A T shaped top electrode thin film member 30 made of a refractory material, such as molybdenum, is vacuum deposited on top of the aluminum interlayer 28. A second T shaped aluminum film 32 is then vacuum deposited on top electrode 30 so that top terminal connector lead 34 can be easily welded thereto. In similar fashion, a rectangular shaped third aluminum film 36 is vacuum deposited on the bottom electrode 14 so that bottom terminal connector 38 can be readily welded thereto. The above described depositions of thin films are performed by a combination of sputtering, evaporation and standard photolithographic procedures used in making thin film semiconductor devices.

Figure 3:
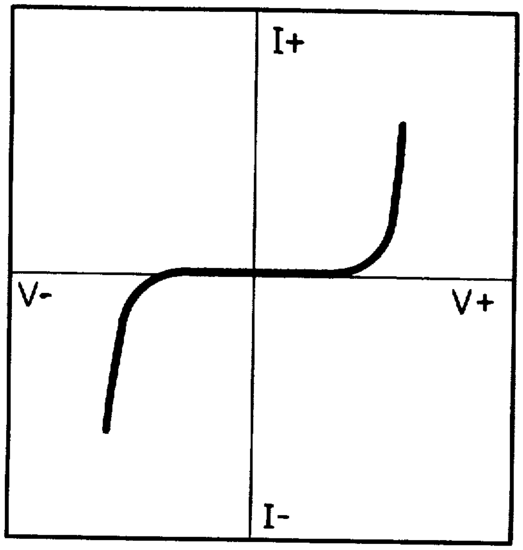
FIG. 3 is a plot of the off-state current (I) versus applied voltage (V).
Figure 4:
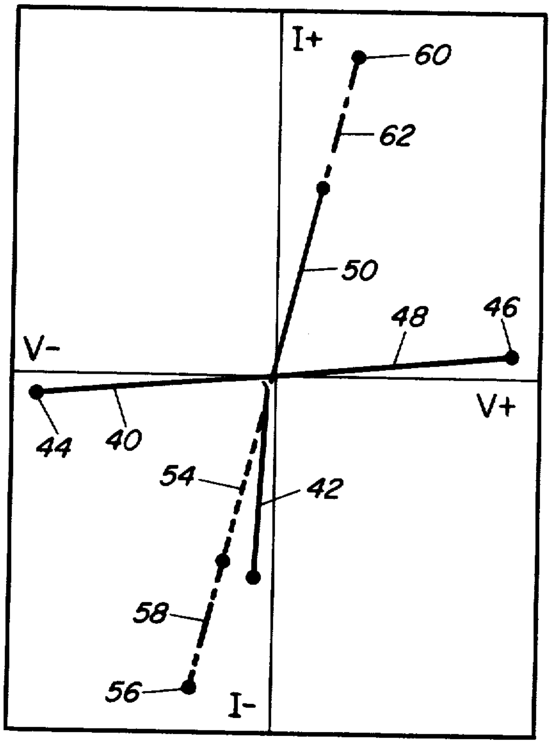
FIG. 4 is a plot of the on-state current (I) versus voltage (V) when the device is operated in the memory mode with the top electrode positive and in the threshold switching mode when the top electrode is at a negative polarity.

Referring now to FIG. 3, the off-state I-V curve is seen to be symmetric for both negative and positive applied voltages even though the thin film layers immediately in contact with the $As_2SeTe_2$ chalcogenide active layer are not symmetrically arranged thereto. Referring now to the on-state I-V curves of FIG. 4, curves 40 and 42 show the device's threshold switching characteristic when a half wave pulsating AC voltage is applied to the top electrode connector 34 in such manner so that it has a negative polarity with respect to the bottom electrode connector 38. When the applied voltage exceeds a threshold voltage at point 44, the device will switch from the I-V characteristic of curve 40 to that of curve 42. In the opposite polarity, that is, when a half wave AC voltage is applied to the device so that the top electrode 34 is positive with respect to the bottom electrode 38, the device operates in the memory mode. In this mode the device turns on when the threshold voltage is reached at point 46 and switches from having a high resistance I-V characteristic curve 48 to that of the low resistance curve 50. The levels of threshold switching voltage at points 44 and 46 are the same for the threshold switching mode and the memory mode respectively. Once the device is put into the memory mode it turns on when the threshold voltage is reached and stays on even when the supply voltage goes to or through the zero voltage and current point. The device now shows low resistance in both polarities and operates along the I-V characteristic curves 50 and 54 respectively depending upon the applied voltage polarity. The device can be reset from the memory mode into an off-state condition by applying a half wave negative voltage signal to the top electrode connector 34 so that the current drawn exceeds a specific value shown by point 56 on line 58. The device will now turn off and follow the threshold switching I-V characteristics of curves 40 and 42. If the top electrode connector 34 is given a positive voltage polarity which does not exceed the threshold voltage point 46, the device will remain in the off-state. Resetting of the memory mode to the off-state is also possible, when the device is operating in the positive right hand quadrant of FIG. 4, by applying a capacitance discharge to the device so that the current exceeds a specified level as indicated by point 60 on line 62. The capacitance type discharge in this mode provides a pulse voltage having a fast decay time which is required by the device to turn off, and without which, the device would immediately return to the on-state condition. In comparison with this case if the top electrode is negative, the device does not "set" again to the on-state during the relatively short duration of a continuous AC 60 cycle half wave because setting in this polarity requires 100–200 millisecond pulse with a trailing edge of approximately 15 milliseconds and therefore under these conditions the device turns off. To summarize, the memory on-state can be turned off or the device reset from the memory mode to the off-state by a 60 cycle half wave AC current of a specific minimum value in the negative polarity mode, or by a capacitor discharge when operated in the positive polarity mode.

Between −40°C. and +125°C. the threshold voltages for the threshold switch and the memory device have been found to be identical and independent of temperature. In addition the memory on-state resistance is also independent of temperature within the aforedescribed temperature range. The memory on-state resistance is the same in both the negative and positive polarities as can be seen by the equality of slope for curves 50 and 54. However, it should be clearly noted that there is a difference between the resistance of the threshold switching on-state mode, as represented by the slope of line 42, and the memory on-state resistance as presented by line 54. The difference in the device behavior in the two polarities may be explained by the fact that crystallization is enhanced by the aluminum thin film interlayer.

The foregoing disclosure and drawings are merely illustrative of the principles of this invention and are not to be interpreted in a limiting sense. I wish it to be understood that I do not desire to be limited to the exact details of construction shown and described for obvious modifications will occur to a person skilled in the art.

Having thus fully described the invention, what is claimed as new and desired to be secured by letters patent of the united states is:

1. A two terminal amorphous switching device with memory which comprises:

a silicon substrate having a first silicon oxide layer thereon;

a bottom electrode means, deposited on said first silicon oxide layer, for providing a first electrical connection to said device;

a second silicon oxide layer, having approximately a 20-50 micron diameter orifice therein, deposited on said bottom electrode means and said substrate, wherein said second oxide layer partially covers said bottom electrode means;

amorphous thin film semiconductor means for providing said device with an active thin film element, said amorphous thin film means being partially deposited on said second silicon oxide layer and said bottom electrode means through said approximately 20–50 micron diameter orifice;

a top electrode means for providing a second electrical connection to said device; and thin film interlayer means for enhancing crystallization in said device, said interlayer covering said thin film amorphous semiconductor means and being disposed intermediate said amorphous thin film semiconductor means and said top electrode means.

2. A two terminal amorphous switching device with memory as recited in claim 1 wherein said bottom electrode means comprises:

a rectangularly shaped bottom molybdenum electrode member vacuum deposited on said first silicon oxide layer;

a rectangularly shaped aluminum film member vacuum deposited on a portion of said molybdenum; and a bottom terminal connector lead member fixedly welded to said rectangularly shaped aluminum film member, said bottom terminal connector providing a first electrical connection from a voltage source to said device.

3. A two terminal amorphous switching device with memory as recited in claim 1 wherein said amorphous thin film semiconductor means comprises an amorphous chalcogenide layer, $As_2SeTe_2$.

4. A two terminal amorphous switching device with memory as recited in claim 1 wherein said amorphous thin film semiconductor means comprises an amorphous chalcogenide layer having a thickness of approximately 0.8 microns and an active area of approximately 400–2500 $\pi$ square microns.

5. A two terminal amorphous switching device with memory as recited in claim 1 wherein said top electrode means comprises:

a T shaped molybdenum member vacuum deposited on top of said interlayer means;

a T shaped aluminum film member vacuum deposited on top of said T shaped molybdenum member; and a top terminal connector lead fixedly welded to said T shaped aluminum film member, said top terminal connector providing a second electrical connection from said voltage source to said device.

6. A two terminal amorphous switching device with memory as recited in claim 1 wherein said thin film interlayer means comprises:

a first T shaped aluminum interlayer member having a thickness of approximately 0.7 microns, said aluminum interlayer deposed on top of said T shaped molybdenum member intermediate said amorphous chalcogenide layer and said T shaped molybdenum member, wherein when said top electrode means is given a positive polarity with respect to said bottom electrode means said device exhibits memory setting with a pulse having a duration of 20–70 microseconds without a trailing edge, when said top electrode means is given negative polarity with respect to said bottom electrode means said device exhibits threshold switching properties, and wherein the incorporation of said crystallization-accelerating aluminum interlayer member in said device results in a single device which has both threshold switching and memory switch properties.

* * * * *